US011980900B2

(12) United States Patent
LaMariana et al.

(10) Patent No.: US 11,980,900 B2
(45) Date of Patent: May 14, 2024

(54) ADJUSTABLE NOZZLE

(71) Applicants: Kristy LaMariana, Corrales, NM (US); Simon Bilton, Warwick (GB); Matt Edwards, Warwick (GB); James Bozeat, Warwick (GB)

(72) Inventors: Kristy LaMariana, Corrales, NM (US); Simon Bilton, Warwick (GB); Matt Edwards, Warwick (GB); James Bozeat, Warwick (GB)

(73) Assignee: Kristy LaMariana, Corrales, NM (US)

( * ) Notice: Subject to any disclaimer, the term of this patent is extended or adjusted under 35 U.S.C. 154(b) by 565 days.

(21) Appl. No.: 16/815,930

(22) Filed: Mar. 11, 2020

(65) Prior Publication Data

US 2020/0290062 A1 Sep. 17, 2020

Related U.S. Application Data

(60) Provisional application No. 62/816,556, filed on Mar. 11, 2019.

(51) Int. Cl.
*B05B 1/34* (2006.01)
*B05B 15/25* (2018.01)
*B05B 15/58* (2018.01)

(52) U.S. Cl.
CPC .............. *B05B 1/341* (2013.01); *B05B 15/25* (2018.02); *B05B 15/58* (2018.02)

(58) Field of Classification Search
CPC .. B05B 1/06; B05B 1/083; B05B 1/12; B05B 1/3033; B05B 1/3037; B05B 1/341; B05B 1/3415; B05B 1/3421; B05B 3/04; B05B 15/20; B05B 15/25; B05B 15/58
See application file for complete search history.

(56) References Cited

U.S. PATENT DOCUMENTS

| | | | | | |
|---|---|---|---|---|---|
| 1,493,150 | A * | 5/1924 | Deming | B05B 1/3033 | 239/491 |
| 4,098,461 | A * | 7/1978 | Weller | B05B 3/04 | 239/381 |
| 5,143,293 | A * | 9/1992 | Pairis | B05B 1/3405 | 239/467 |
| 5,857,626 | A * | 1/1999 | Hsu | B05B 1/3006 | 239/381 |
| 6,000,636 | A * | 12/1999 | Huang | B05B 1/3431 | 239/464 |
| 2007/0026269 | A1* | 2/2007 | Nakakubo | F16K 99/0001 | 137/859 |
| 2018/0207460 | A1* | 7/2018 | Abbott | A62C 31/05 | |

* cited by examiner

*Primary Examiner* — Jason J Boeckmann
(74) *Attorney, Agent, or Firm* — Andrew Morabito

(57) ABSTRACT

A nozzle comprising: a main body having a sidewall, a first end and, a second end, wherein the main body has a central channel extending from the first end to the second end and at least one aperture extending through the sidewall distal to the second end and a retention means is positioned within the channel positioned between the second end and the at least one aperture; a collar having a lip disposed at a first end and a securement means disposed at a second end adjustably attached to the main body, wherein a cavity is formed between the main body and the collar and in a first position the lip creates a tight seal with the main body; a blocker positioned within the channel of the main body, wherein the blocker freely rotating about a central axis of the channel; and a means of axially retaining the blocker within the channel.

2 Claims, 8 Drawing Sheets

ADJUSTABLE NOZZLE

CROSS-REFERENCE TO RELATED APPLICATIONS

This application is a continuation-in-part (and claims the benefit of priority under 35 USC 120) of U.S. application No. 62/816,556 filed Mar. 11, 2019. The disclosure of the prior applications is considered part of (and is incorporated by reference in) the disclosure of this application.

BACKGROUND OF THE INVENTION

The present invention relates to nozzle, and more particularly to an adjustable nozzle for creating a fluid flow that has continually adjustable velocity or intensity.

There have been various improvements relating to devices for taking showers and at the same time providing a massaging action which is imparted by the flow of water. One of these known devices for showering and massaging is a shower head that is mounted to a fixed outlet neck, the head being adjustable to various angles. The combination shower-and-massage shower head is well known for its ability to be adjusted to provide various angles of pulsating sprays that establish the massaging action. However, until the present invention, this type of shower head has been limited in its capabilities.

Many showerheads emit pulsating streams of water in a so-called “massage” mode. Typical massage modes are achieved by rotating a shutter in a circular manner that blocks or covers nozzle apertures as it spins. Due to the circular rotation path, nozzles are opened in a sequential manner and many times a first nozzle aperture will be partially closed as the shutter rotates to close a second nozzle aperture (which will be partially open until the rotation moves the shutter further). This distributes the water across multiple nozzle outlets, reducing the force experienced by the user in the massage mode. Additionally, many massage mode nozzle outlets are arranged in a center of the showerhead and are clustered tightly together. This means that the water exiting the nozzles impacts a small surface area on the user. As such, there is need for an improved massage mode for a showerhead that increases the force experienced by a user, expands the impact area on a user’s body, or both.

Accordingly, as recognized by the present inventors, there is a need for a shower head that allows the user to adjust the flow rate to a user’s preferred velocity and intensity and has a pulsation functionality to provide for a massaging or stimulating feature.

The information included in this Background section of the specification, including any references cited herein and any description or discussion thereof, is included for technical reference purposes only and is not to be regarded subject matter by which the scope of the invention is to be bound.

SUMMARY

Accordingly, it is an objective of the present invention to provide a nozzle, showerhead, or apparatus that provides the benefits of creating a fluid flow that has continually adjustable velocity and intensity and has the option of creating a pulsating flow so that the apparatus can provide a massaging or stimulating function.

In a first embodiment, the present invention is a nozzle comprising: a main body having a sidewall, a first end and, a second end, wherein the main body has a central channel extending from the first end to the second end and a set of slots extending through the sidewall distal to the second end and a retention means is positioned within the channel positioned between the second end and the slots; a collar having a lip disposed at a first end and a securement means disposed at a second end adjustably attached to the main body, wherein a cavity is formed between the main body and the collar and in a first position the lip creates a substantial fluid tight seal with the main body; a blocker having castellations and secured within the channel of the main body, wherein the blocker is freely rotating within the channel; and a stopper positioned within the channel and securing the blocker within the channel and not restricting the rotation of the blocker.

In a second embodiment the present invention is a nozzle comprising: a main body having a central channel with a primary exit orifice, wherein a plurality of slots are positioned at predetermined locations and predetermined tangential angles from a central axis; a collar rotatably connected to the main body, wherein a cavity is formed between the main body and the collar and the slots provide entry from the central channel of the main body into the cavity; and a blocker secured within the central channel, wherein the blocker is able to rotate freely about a central axis but secured in a set position.

A nozzle comprising: a main body having a central channel with a first end and a second end, wherein a plurality of slots are present distal to the first end and extend from a central axis at a predetermined angle; a hollow collar rotatably connected to the main body, wherein a cavity is formed between the main body and the hollow interior of the collar and wherein the slots provide an entry from the central channel of the main body into the cavity; and a blocker with an internal design to encourage rotation positioned within the central channel relative to the slots, and wherein the blocker is able to rotate freely about a central axis but is unable to reposition within the central channel.

DETAILED DESCRIPTION OF THE INVENTION

The present invention provides a nozzle, showerhead, or apparatus that provides the benefits of creating a fluid flow that has continually adjustable velocity and intensity and has the option of creating a pulsating flow so that the apparatus can provide a massaging or stimulating function.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms “a”, “an”, and “the” include plural referents unless the context clearly dictates otherwise. It is further noted that the claims may be drafted to exclude any optional element. As such, this statement is intended to serve as antecedent basis for use of such exclusive terminology as “solely,” “only” and the like in connection with the recitation of claim elements or use of a “negative” limitation.

Figure 1:
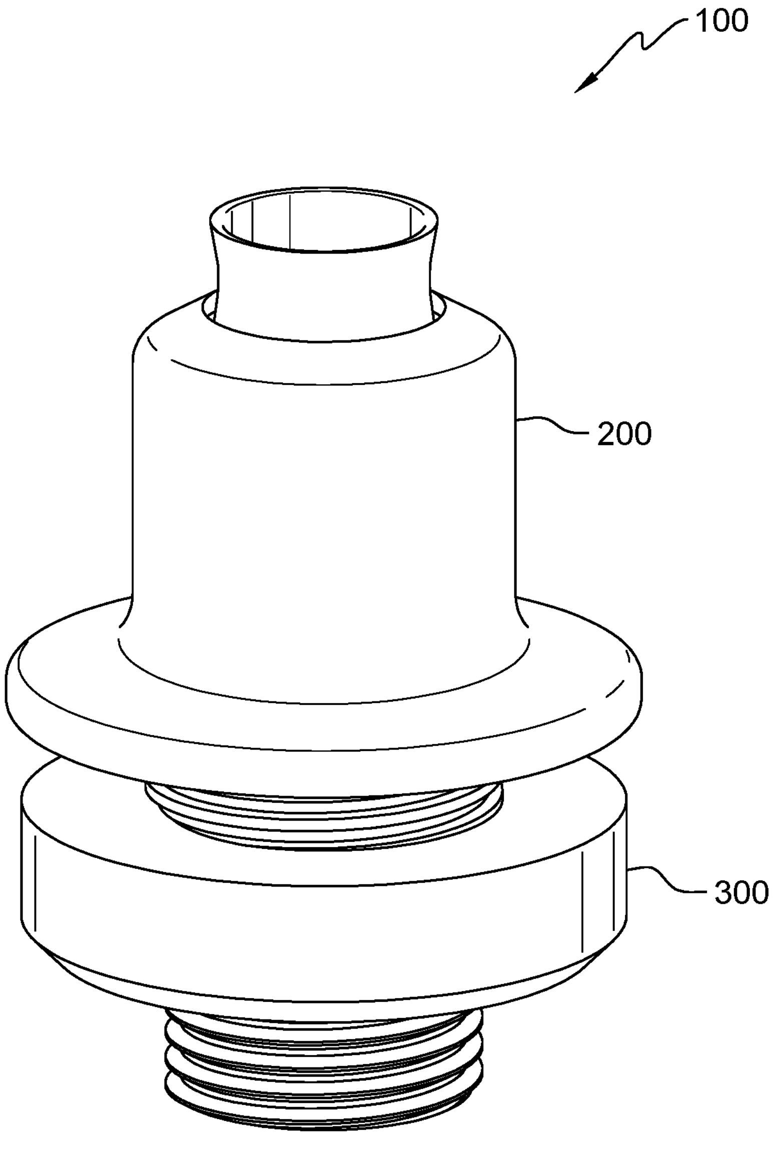
FIG. 1 depicts an isometric view of a nozzle, in accordance with one embodiment of the present invention.

FIG. 1 depicts an isometric view of a nozzle 100, in accordance with one embodiment of the present invention. The nozzle 100 is comprised of a collar 200 and a main body 300.

Figure 2:
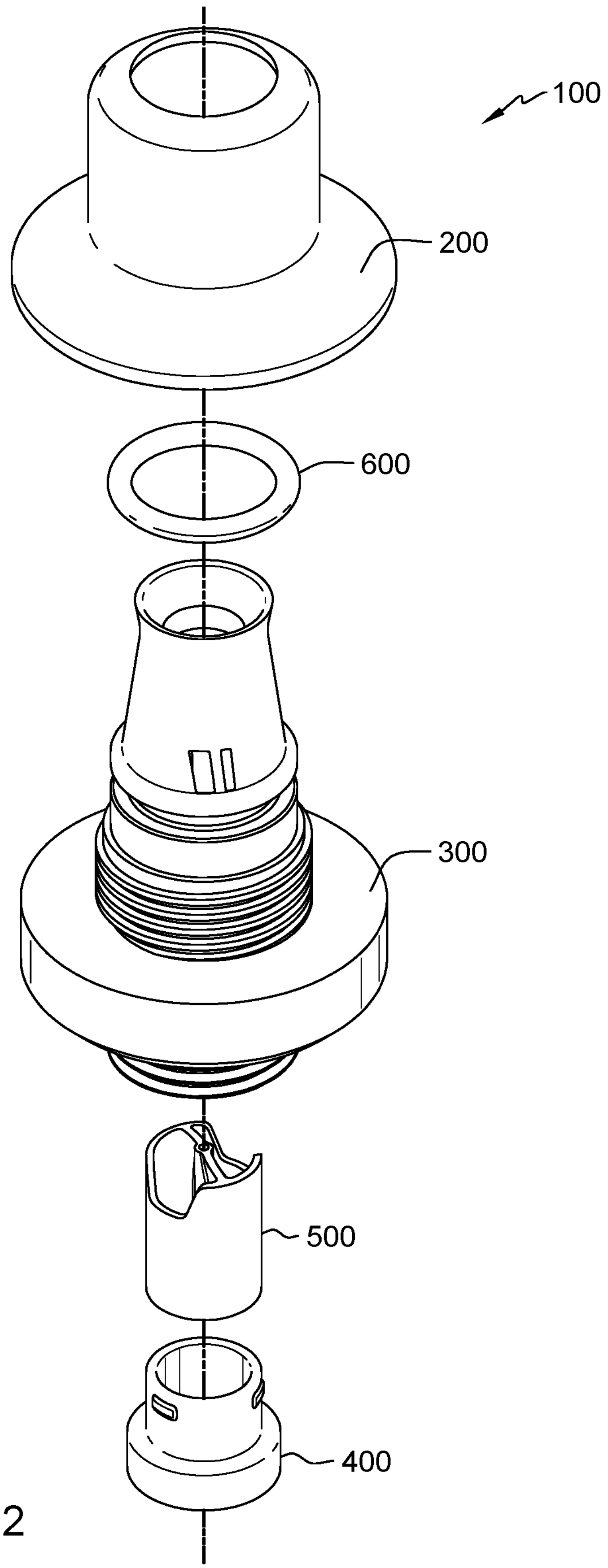
FIG. 2 depicts an isometric exploded view of the nozzle, in accordance with one embodiment of the present invention.

FIG. 2 depicts an isometric exploded view of the nozzle 100, in accordance with one embodiment of the present invention. The internal components of the nozzle 100 are shown. The stopper 400, the blocker 500, and the O-ring 600 are shown. The O-ring 600 is used to create a substantially water tight seal between the main body 300 and the collar 200, and may be replaced by various components known to one skilled in the art to create the substantial water tight seal between the main body 300 and the collar 200. In some embodiments, the O-ring 600 is integrated into either the main body 300 or the collar 200. The blocker 500 is fitted within the interior of the main body 300 and in the direct path of the fluid flow. The blocker 500 has inclined or helical ribs such that the blocker 500 spins as the fluid flows through it. The blocker 500 is kept in place by the stopper 400 and the main body 300. The stopper 400 is secured within the main body 300 to permit the blocker 500 to rotate in place but retain the blocker 500 from moving upwards or downwards. Various types of stoppers may be used to secure the blocker 500 in place, the depicted embodiment of the stopper 400 is only one embodiment of the stopper 400 design.

Figure 3:
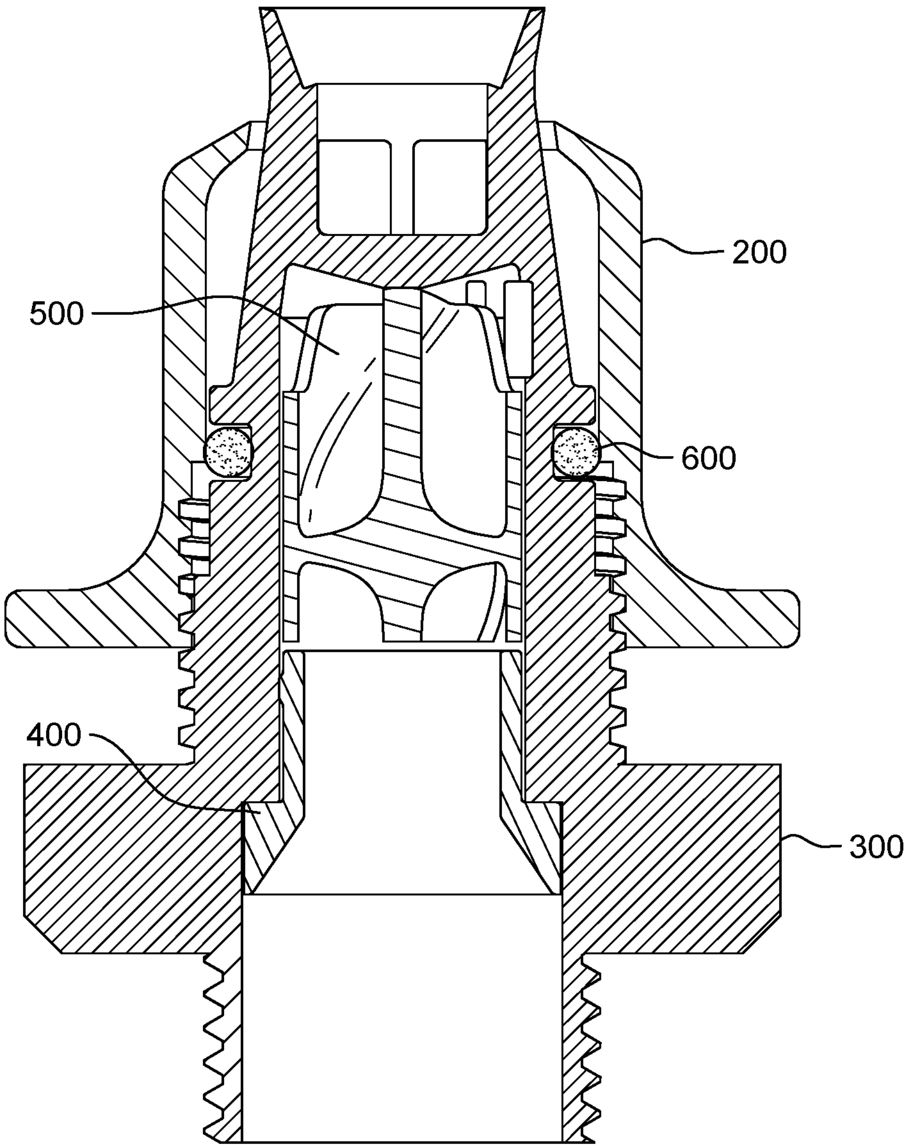
FIG. 3 depicts a section view of the nozzle, in accordance with one embodiment of the present invention.

FIG. 3 depicts a section view of the nozzle 100, in accordance with one embodiment of the present invention. The collar 200 is shown secured to the main body 300 by the mating threaded portions of each component. The O-ring 600 is positioned within a cavity in the main body 300 and in contact with the collar 200 to create a fluid tight seal between the two components to keep any fluid from exiting through the threaded portions. The blocker 500 is positioned within the internal channel of the main body, able to freely rotate in place, and the stopper 400 is positioned in close proximately to the blocker 500 to keep the blocker 500 from moving in a vertical direction, while permitting the blocker to rotate about a central axis. The stopper 400 and the blocker 500 has a slight gap between the two in the depicted embodiment so when fluid is flowing through the nozzle 100, the blocker 500 is not in contact with the stopper 400 and able to freely rotate.

Figure 4:
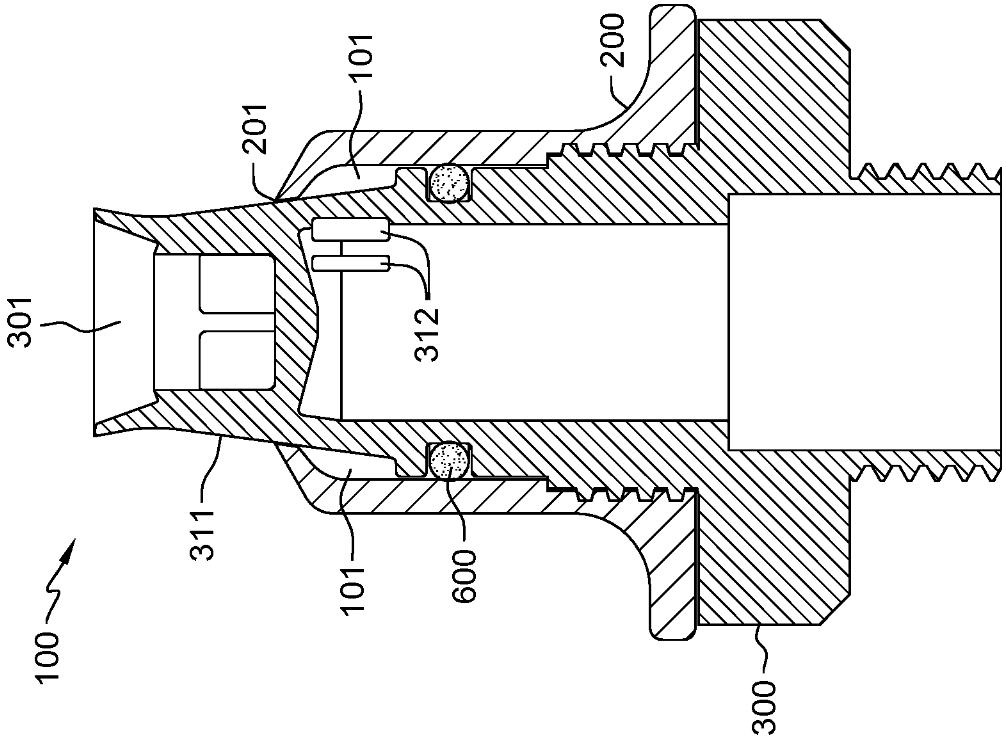
FIG. 4 depicts a section view of the nozzle in a “closed” position, in accordance with one embodiment of the present invention.

FIG. 4 depicts a section view of the nozzle 100 in a “closed” position, in accordance with one embodiment of the present invention. In the present illustration, the collar 200 is shown secured to the main body 300. With the O-ring 600 in place, the fluid passes through the main body 300 and is directed through the orifice 301 of the main body 300. The fluid exits the orifice 301 as the primary jet. In this position, the total exit area of the nozzle 100 is at its lowest and therefore the velocity will be the highest. Through slots 312 (e.g. apertures, openings, gap, slit, passage, vent, or the like) of the main body 300, the fluid is able to exit into the cavity 101 between the collar 200 and the main body 300. In the depicted embodiment, two portions of the cavity 101 are shown, but encompasses the entire space between the collar 200 and the main body 300. However, when the collar 200 is in the “closed” position, the lip 201 of the collar 200 created a substantially watertight seal with the exterior surface 311 of the main body 300 and the fluid is unable to exit from within the cavity 101. The lip 201 of the collar, may have various coatings and features to improve the watertight seal formed in the “closed” position.

Figure 5:
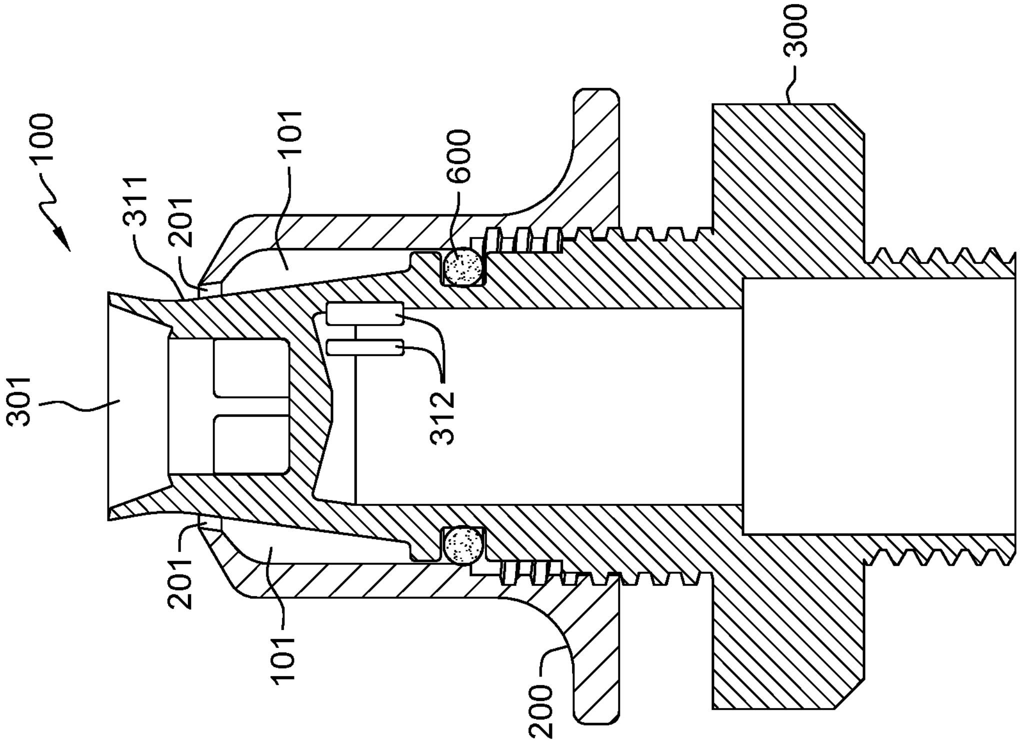
FIG. 5 depicts a section view of the nozzle in an “open” position, in accordance with one embodiment of the present invention.

FIG. 5 depicts a section view of the nozzle 100 in an “open” position, in accordance with one embodiment of the present invention. The collar 200 is able to from the rearmost position (“closed”) to a foremost position (“open”). In the depicted embodiment, based on the threaded fastening securement means between the collar 200 and the main body 300, there a theoretical infinite number of positioned which the collar 200 can be placed in. In other embodiments, where the securement means between the collar 200 and the main body 300 where there is limited to a set number of positions. As the collar is moved from the “closed” position to the “open” position a gap 102 is formed between the lip 201 and the exterior surface 311, wherein the fluid is now able to exit the gap 102 and a secondary jet is formed. Based on the shape of the main body 300 and the collar 200 in the present embodiment, the secondary jet has an annulus shape to the fluid flow. The shape and direction of the secondary jet is based on the design of the lip 201 and the profile of the exterior surface 311. In the depicted embodiment, the main body 300 has a taper like shape so that the gap 102 increases in size the further the collar 200 moves from the "closed" position to the "open" position. As the collar 200 is moved from the "closed" position to the "open" position, the gap 102 increases in size, thereby allowing more fluid to exit through the gap 102 and increased the total area of the flow of the fluid and thus decreasing the velocity of the fluid. This allows for the velocity of the exit flows to be adjusted without adjusting the supply flowrate in the system. In some embodiments, based on the flow rate of the fluid, the volume of the primary jet may not be affected as the collar 200 approaches the "open" position.

Figure 6:
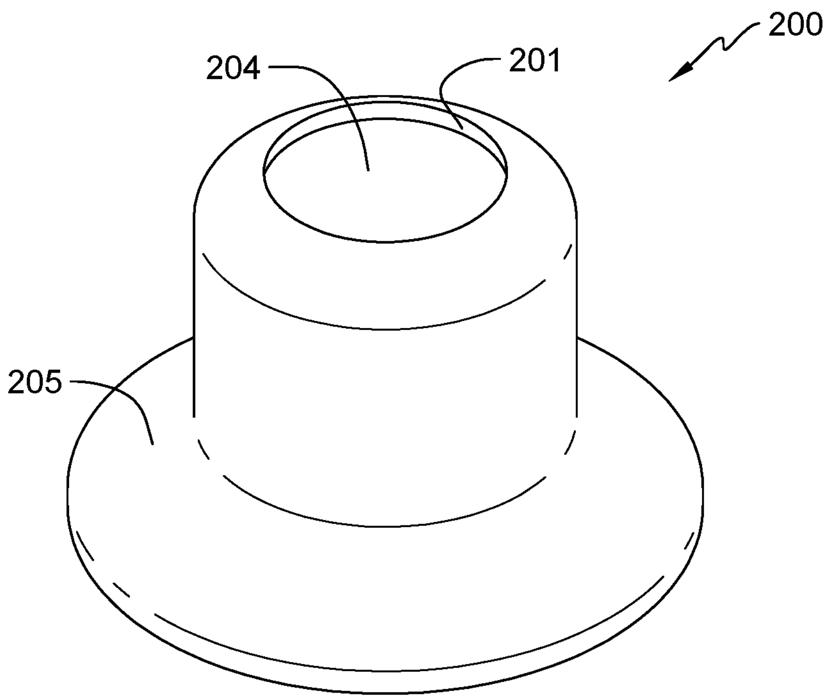
FIG. 6 depicts an isometric view of a collar, in accordance with one embodiment of the present invention.
Figure 7:
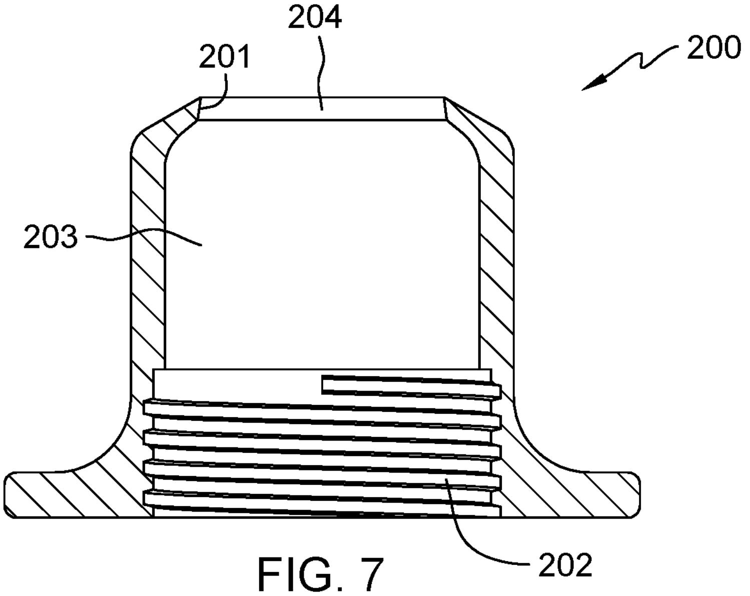
FIG. 7 depicts a section view of the collar, in accordance with one embodiment of the present invention.

FIGS. 6 and 7 depicts images of the collar 200, in accordance with one embodiment of the present invention. The collar 200 has a mating securement portion 202 which mates with the securement means 305. At an opposing end, an aperture 204 is formed and the aperture 204 has lip 201 wherein a channel 203 is formed. The channel 203 profile is dependent upon the desired volume and shape of the cavity 101. In the present embodiment, the channel 203 is tapered as it approaches the aperture 204. This taper assists with forming the cavity 101 and permitting the lip 201 to interface with the exterior surface 311 of the main body 300. The overall shape and design of the collar 200 provides for an ergonomic design for the user to interact with the collar 200 when using the nozzle 100. The collar 200 may have various coatings or covers to provide for varying degrees of comfort and grip. The overall profile of the exterior 205 may be altered to provide a more ergonomic of stylized design.

Figure 8:
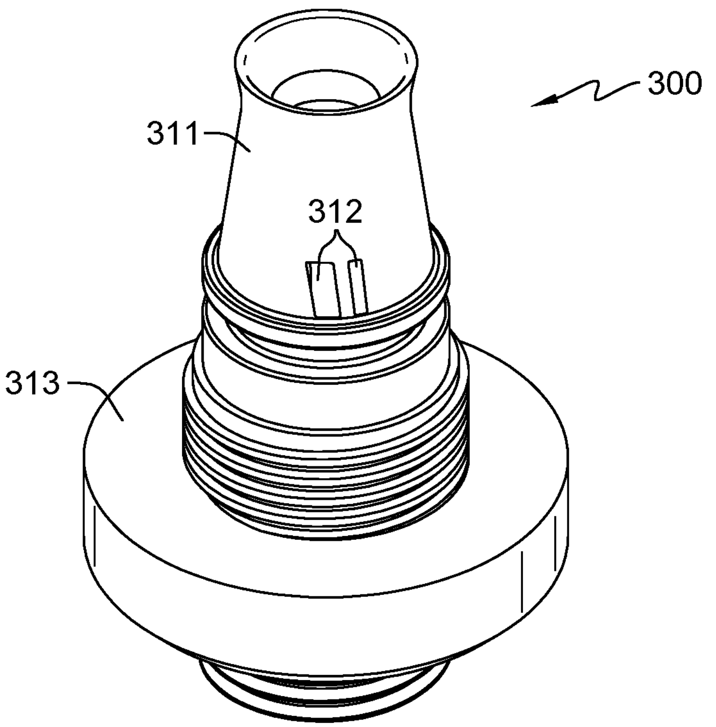
FIG. 8 depicts an isometric view of a main body, in accordance with one embodiment of the present invention.
Figure 9:
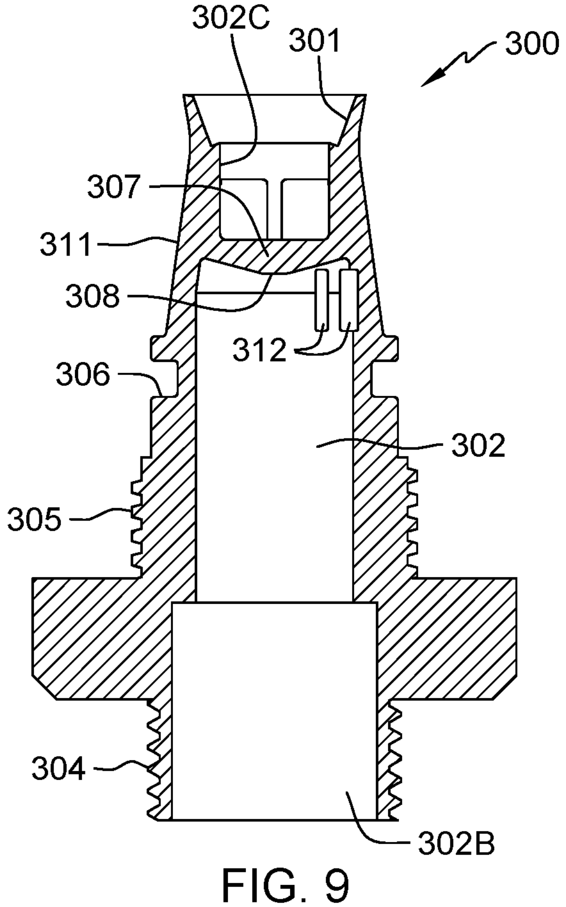
FIG. 9 depicts a section view of the main body, in accordance with one embodiment of the present invention.

FIGS. 8 and 9 depicts images of the main body 300, in accordance with one embodiment of the present invention. The main body 300 consists of a central shaft 302 where the blocker 500 and the stopper 400 are positioned within. In the depicted embodiment the central shaft 302 has section 302B to fit the stopper 400. In other embodiments, based on the stopper 400 design, the shaft may have different contours or profiles. The stopper 400 may be integrated into the main body 300. The stopper 400 is designed to reduce the axial movement of the blocker 500. The central shaft 302 has a cross section and size to accommodate the blocker 500 and the stopper 400, while also permitting the proper flow rate of the fluid. A fastening means 304 permits the main body 300 to be secured to a hose or shower pipe connector. A securement means 305 permits the collar 200 to be secured to the main body 300 with a mating securement means. In the depicted embodiment, the fastening means 304 and the securement means 305 is a threaded design. Base 313 provides a limit to the positions which the collar 200 can be positioned. In additional embodiments, various other fastening and securement means know to one skilled in the art may be implemented into the nozzle 100. A channel 306 is positioned to receive the O-ring 600. The channel 306 is sized and shaped to receive the O-ring 600 or the like. The main body 300 exterior surface 311 has a predetermined contour or profile to permit the channel 306 to house the O-ring 600 and provide a surface for the lip 201 of the collar 200 to come in contact with and create a fluid tight seal. The contour and profile of the exterior surface 311 is variable and based on the desired flow shape, flow rate, and flow velocity, of the fluid in the "open" positions. In the depicted embodiment, the exterior surface 311 has a tapered design as the exterior surface 311 approaches the orifice 301. The channel 302C exits at the orifice 301. The orifice 301 may have various shapes and profiles based on the desired shape, velocity, and flow rate of the fluid through the orifice 301. In the depicted embodiment, the orifice 301 has a reversed taper design (e.g. swell) to create a specific fluid exit shape. The shape of the orifice 301 is used to attenuate the velocity and increase the area of the fluid flow.

Positioned in the center of the channel 302 has a fixture 307 integrated into the channel 302 and which interfaces with the blocker 500 to assist in keeping the blocker 500 in the desired position and orientation, while also permitting the blocker 500 to rotate freely. The fixture has mounting point 308, where the blocker 500 has a reciprocal dimple to receive the mounting point 308 and provide the support to maintain the desired orientation through use. Positioned distal to the fixture 307 is a series of slots 312. In the depicted embodiment, the slots 312 are angled relative to the main body 300 (shown in FIG. 10) such that the fluid flowing through the slots 312 is redirected off the slot walls and creates a flow which is tangential to the channel 302 within the cavity 101 where the fluid exits into. When the fluid exits via the secondary jet the tangential component of the flow will act to through the fluid in an outwards direction. This will help to keep the primary and secondary jets separate and also allows the secondary jet to cover a broader area. In the present invention two sets of two slots 312 are present in the main body 300 and are positioned opposite one another about a central plane of the main body 300. In additional embodiments, additional helical ribs or slots could be added in order to further promote swirling on the fluid within the cavity 101. Additionally, the positioning of the slots 312 may also be modified or adjusted.

Figure 10:
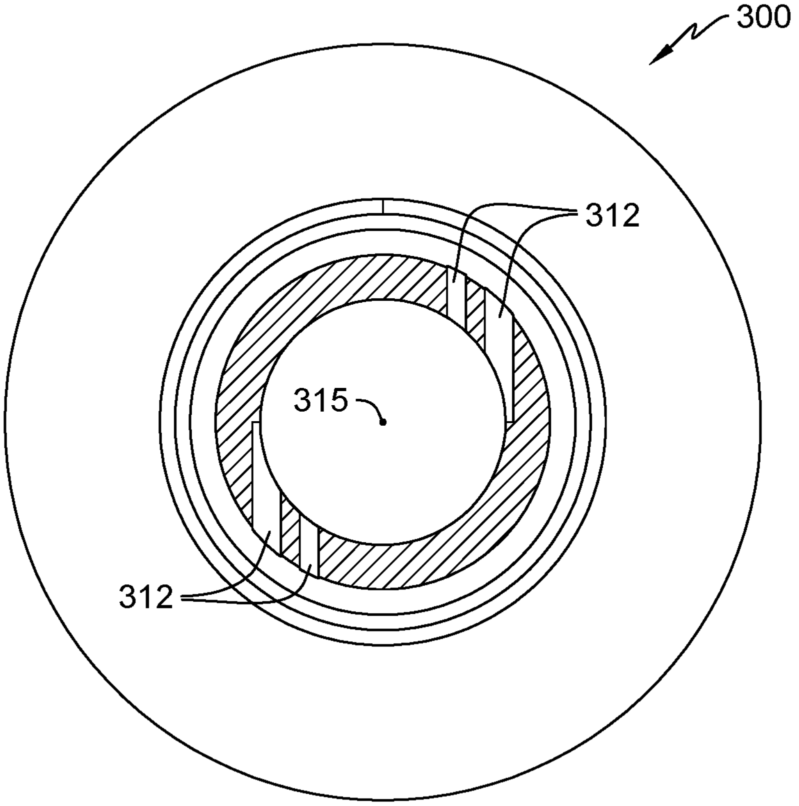
FIG. 10 depicts another section view of the main body, in accordance with one embodiment of the present invention.

FIG. 10 shows a section view of main body 300, in accordance with one embodiment of the present invention. In the depicted embodiment, the slots 312 are shown extending tangential to the channel 302 and mirrored about a center axis 315. The slots 312 are apertures or varying quantity, shape, size, and position provided they permit the passage of fluid. In the depicted embodiment, the slots 312 have varying sizes. The positioning and quantity of the slots 312 may be altered based on the desired stream pulsation, intensity, direction, and shape of the secondary jet.

Figure 11:
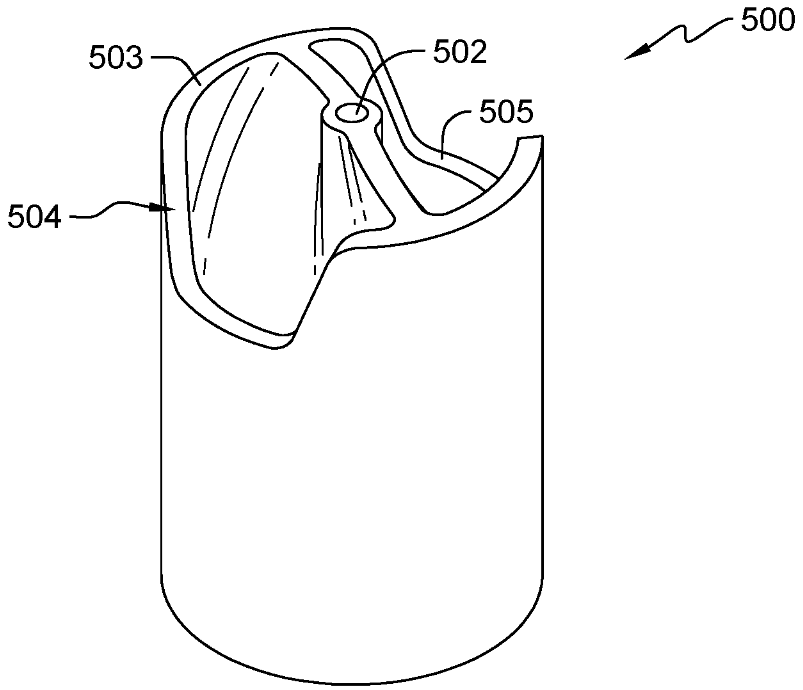
FIG. 11 depicts an isometric view of a blocker, in accordance with one embodiment of the present invention.
Figure 12:
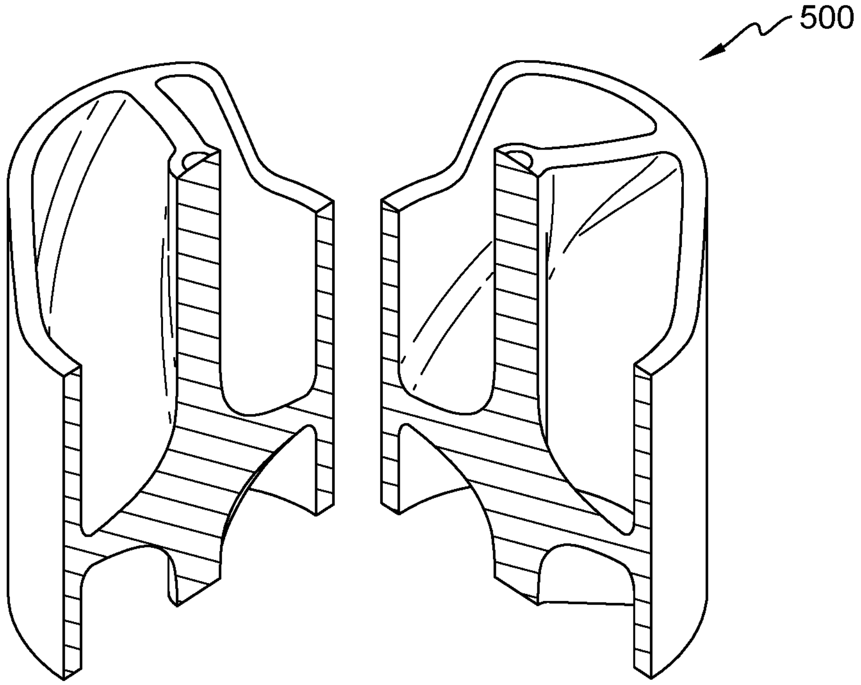
FIG. 12 depicts an isometric split view of the blocker, in accordance with one embodiment of the present invention.

FIGS. 11 and 12 depict an isometric view of the blocker 500 and a section view of blocker 500, in accordance with one embodiment of the present invention. The blocker 500 is a substantially cylindrical design sized to fit within the channel 302. At a first end a fixture point 502 is present which interfaces with the fixture point 308 to keep the blocker 500 in the proper orientation, but not limit the blocker 500 ability to rotate about the center axis 315. The fixture point 308 may be a divot or a protrusion provided the mating fixture point 308 is the mating reciprocal. The blocker 500 has a double hexic design wherein two separate paths are formed within the blocker 500. Due to the double hexic design, when the fluid passes through the blocker, the blocker spins about the central axis. In additional embodiments, various other types of features may be integrated into the blocker 500 which are non-parallel with the flow of the fluid to force the blocker 500 to rotate when the fluid passes through the blocker 500. In various embodiments, the internal design of the blocker 500 may be altered provided the design encourages the blocker 500 to rotate. In some embodiments, a turbine like design with blades may be incorporated into the blocker 500. In various embodiments, different blades or features may be integrated into the blocker 500 design to encourage rotation about the central axis. At the first end with the mating point 502 there are castellations 504 incorporated into the blocker 500 design. In the present embodiment, the castellations 504 are created by the contour of a top edge. In additional embodiments, the castellations 504 may be replaced with apertures or other features that permit a pulsating flow of fluid into the slots 312. These castellations 504 are of a predetermined size and shape. As the blocker 500 spins or rotates, the castellations 504 align with the slots 312 and the fluid is able to enter the slots 312 and then into the cavity 101. When the low point of a castellation 504 coincides with the slots 312, the castellations 504 allow full fluid flow to the cavity 101. When the high points 503 of the castellation 504 covers the slots 312, the fluid flow is blocked (or partially blocked) restricting the flow of fluid to the cavity 101 and in turn the secondary jet. In this way the blocker will cyclically restrict flow to the cavity 101 causing the velocity of the primary and secondary jets to vary. Based on the size, positions, number, and contour of the castellations 504, the varying of the secondary jet (and indirectly the primary jet) can be changed. In some embodiments, the blocker 500 is removable through the removal of the stopper 400 and the blocker 500 can be replaced to provide the user with varying fluid flow rates and pulsation settings.

The flow of the primary jet will generally be greatest when the slots 312 are at their most restricted. At their lest restricted the secondary flow will be at its greatest (and the primary flow at its least). The shape of the castellation 504 can be tuned and need not completely block or unblock the holes. In the depicted embodiment, it is envisaged that all slots 312 would be restricted at the same time, but a different flow effect could be achieved by alternately blocking the slots 312.

The various components and parts of the invention may be made from, but not limited to polyethylene, polyethylene terephthalate, high-density polyethylene, polypropylene, polystyrene, polyvinyl chloride, polyurethane, poly carbonate, polybutylene terephthalate, acrylonitrile styrene acrylate, acrylics, aluminum, steel, cooper, various other metals, a combination of plastics and metals, or the like.

While this invention has been described in conjunction with the specific embodiments outlined above, it is evident that many alternatives, modifications and variations will be apparent to those skilled in the art. Accordingly, the preferred embodiments of the invention, as set forth above, are intended to be illustrative, not limiting. Various changes may be made without departing from the spirit and scope of this invention.

What is claimed is:

1. A nozzle comprising:

a main body having a central channel with a first end and a second end, wherein a plurality of apertures are present distal to the first end and extend from a central axis at a predetermined angle and a first cavity distal to a thread portion of an exterior surface of the main body, and wherein the plurality of apertures are of different sizes;

a hollow collar rotatably connected to the main body by mating with the thread portion of the main body, wherein a second cavity is formed between the main body and the hollow interior of the collar and wherein the plurality of apertures provides an entry from the central channel of the main body into the second cavity;

a cylindrical blocker having a top edge with a set of castellations with an internal design to encourage rotation axially retained within the central channel, and wherein the blocker is able to rotate freely about a central axis and the set of castellations align with the plurality of apertures of the main body;

an o-ring inserted into the first cavity of the main body; and a stopper inserted into the main body below the cylindrical blocker.

2. The nozzle of claim 1, wherein the castellations are in an array pattern about the central axis.

* * * * *